J. W. BROKAW & T. HARDING.
REAPING AND MOWING MACHINE.
No. 18,833. Patented Dec. 8, 1857.
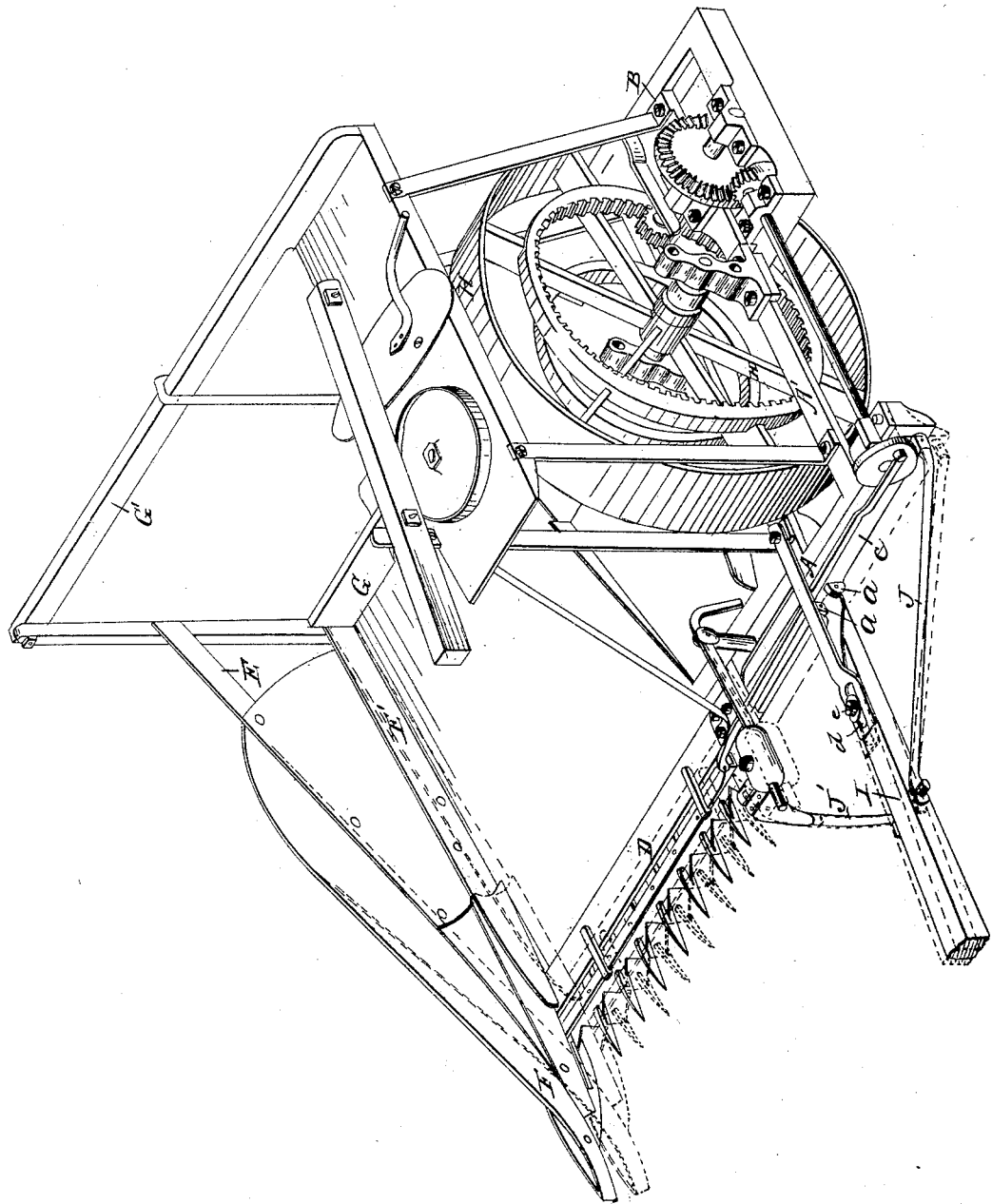

UNITED STATES PATENT OFFICE.

J. W. BROKAW AND THOS. HARDING, OF SPRINGFIELD, OHIO, ASSIGNORS TO WARDER, BROKAW & CHILD, OF SAME PLACE.

IMPROVEMENT IN REAPING AND MOWING MACHINES.

Specification forming part of Letters Patent No. 18,833, dated December 8, 1857.

*To all whom it may concern:*

Be it known that we, JOHN W. BROKAW and THOMAS HARDING, of Springfield, in the county of Clarke and State of Ohio, have invented a certain new and useful Improvement in Reaping and Mowing Machines, of which the following is a full, clear, and exact description, reference being had to the accompanying drawing, making part of this specification, in which the figure represents a view in perspective of a machine embracing our improvement, showing in black lines the position of the knife, fingers, and tongue in reaping, and in red the position in mowing.

Our improvement relates to a new method of raising and lowering the finger-bar for the purpose of regulating the height at which the grain or grass is to be cut, and at the same time and by the same means to relieve the joints of the tongue from strain. This heretofore has generally been effected in one of two ways, either by a lever for the purpose so attached to the frame as to cause it to turn upon its axis, or else by raising or lowering the bearings of the driving and supporting wheels, the first being principally used for the purpose of surmounting stumps and other inequalities of the ground, as well as of altering the height of the cut, the second for the latter alone; but as the last-mentioned device is attended with considerable difficulty and consumption of time and labor in making these changes it is highly desirable to have a device by which the alteration can be readily effected and at the same time avoid the effects of the other plan, whose only advantage lies in the ability of the driver to elevate the machine so as to surmount any obstacle which may suddenly present itself; but as such very rarely occurs in the great western prairies, where those machines are principally used, it becomes a much more costly means of effecting a change of the height of the cut than its advantages warrant in its use.

Our improvement for effecting this change consists in the application to the tongue, and which for this purpose must be hinged to the finger-bar or front of the main frame of the machine, of an adjusting-bar secured at one end to the frame or finger-bar of the machine, and at the other to the tongue, and in a line with the same, it being provided with a slot by which the adjustment is effected, the advantage of which is that it not only answers the purpose of adjusting the height of the finger-bar from the ground, but, being in a line with the tongue, it also acts as a draft-bar, which not only materially relieves the joints of the tongue, but transfers a portion of the drag of the machine from the finger-bar to the main frame.

To enable others skilled in the art to make, construct, and use our invention, we will now proceed to describe our improvement in detail, omitting a description of such parts of the machine as are non-essential to a full understanding of our present improvement.

In the accompanying drawing, the machine to which our improvement is represented as being applied consists of two principal parts—first, the frame that supports the driving-wheel and gear, and, secondly, the frame used for the support of the platform, raker's stand, divider, and outer end of the finger-bar, &c.

The first frame consists of two side rails, A and A', connected together at the rear end by a beam, B, which also serves as the connecting-beam of a supplementary frame formed on the side of the outer rail, A', on which the driving-gear is mounted in suitable bearings, and connected at their forward end by the arm C, to which the finger-bar is secured. The other frame consists of the finger-bar D in front, side bars, E and E', to which the divider F and outer end of the finger-bar D are secured, and in rear by beams G and G', the latter of which connects the two frames together, the first of which is mounted on and supported by the driving-wheel H, and the latter by a supporting-wheel arranged on the opposite side of the machine.

To the arm C, or front of the frame, if deemed better, is hinged the rear end of the tongue I, there being for this purpose two lips, *a*, secured to or otherwise formed on the arm, between which it is inserted, through which and the tongue I a bolt, *b*, is passed.

On each side of the tongue are secured braces J by means of screw-bolts, or in any other suitable manner, which are respectively hinged to either end of the arm. These braces serve to equalize the draft of the machine and prevent lateral strain upon the tongue, and, being hinged, also enable the tongue I to be so adjusted to the machine as to regulate the height of the cut, which, when thus adjusted, is clamped or braced in that position by means of an adjusting-bar, K, secured at one end to the inner rail, A, of the driving-wheel frame in any suitable manner, and at the other end to the upper side of the tongue I by means of a screw-bolt, c, passing through a slot, d, formed in the front end of the bar K and the tongue I. This slot enables the tongue to be secured at any required angle to the frame of the machine, whereby the finger-bar can be adjusted to cut at any required height from the ground, as by raising the tongue and securing it in that position to the frame it depresses the finger-bar, as shown in red lines, and vice versa, as shown in black lines. The advantage of this plan of regulating the height of the cut will be apparent, as by it no vibration can be given to the cutters other than that which arises from the irregularity of the ground, while the adjustment itself is effected in the most simple manner and in a very short time.

Having thus fully described our invention, what we claim as new, and desire to secure by Letters Patent, is—

The peculiar method of regulating the height of the cut and relieving the draft on the joints of the tongue by means of the bar K, in combination with a tongue, I, hinged to the finger-bar C, or front of the main frame of the machine, both being constructed and operated and arranged in relation to each other in the manner substantially as described.

In testimony whereof we have hereunto set our hands this 6th day of April, A. D. 1857.

J. W. BROKAW.
THOMAS HARDING.

Witnesses:
ROSS MITCHELL,
GIDEON SMITH.